US011221534B2

(12) United States Patent
Wang et al.

(10) Patent No.: US 11,221,534 B2
(45) Date of Patent: Jan. 11, 2022

(54) METHODS OF MANUFACTURING ELECTROCHROMIC DEVICES CONTAINING A SOLID-STATE ELECTROLYTE

(71) Applicant: HELIOTROPE TECHNOLOGIES, INC., Alameda, CA (US)

(72) Inventors: Xiaoliang Wang, San Leandro, CA (US); Evelyn Davies, Berkeley, CA (US); Pedro Gonzalez, Oakland, CA (US); Guillermo Garcia, Oakland, CA (US); Amir Bayati, Santa Clara, CA (US); John Bohland, Sacramento, CA (US)

(73) Assignee: HELIOTROPE TECHNOLOGIES, INC., Alameda, CA (US)

( * ) Notice: Subject to any disclaimer, the term of this patent is extended or adjusted under 35 U.S.C. 154(b) by 207 days.

(21) Appl. No.: 16/286,783

(22) Filed: Feb. 27, 2019

(65) Prior Publication Data

US 2019/0271893 A1 Sep. 5, 2019

Related U.S. Application Data

(60) Provisional application No. 62/638,418, filed on Mar. 5, 2018.

(51) Int. Cl.
*G02F 1/155* (2006.01)
*G02F 1/161* (2006.01)
(Continued)

(52) U.S. Cl.
CPC ............... *G02F 1/155* (2013.01); *G02F 1/15* (2013.01); *G02F 1/1525* (2013.01);
(Continued)

(58) Field of Classification Search
CPC ........ G02F 1/15; G02F 1/1525; G02F 1/1533; G02F 1/155; G02F 1/161; G02F 2001/1555; G02F 2001/164; G02F 2202/025
See application file for complete search history.

(56) References Cited

U.S. PATENT DOCUMENTS

| 5,418,091 A | 5/1995 | Gozdz et al. |
| 6,995,891 B2 | 2/2006 | Agrawal et al. |
| (Continued) | | |

FOREIGN PATENT DOCUMENTS

| EP | 0434359 A2 | 6/1991 |
| KR | 1020130025078 A | 3/2013 |
| WO | WO 2016-150921 A1 | 9/2016 |

OTHER PUBLICATIONS

Notification Concerning Transmittal of International Preliminary Report of Patentability from the International Search Authority for International Patent Application No. PCT/US2019/019733, dated Sep. 17, 2020, 9 pages.

(Continued)

*Primary Examiner* — Joseph P Martinez
*Assistant Examiner* — Vipin Patel
(74) *Attorney, Agent, or Firm* — The Marbury Law Group PLLC

(57) ABSTRACT

A method of forming an electrochromic (EC) device includes forming a solid-state first electrolyte layer, after forming the solid-state first electrolyte layer, laminating the first solid-state first electrolyte layer between a transparent first substrate and a transparent second substrate such that a transparent first electrode is disposed between the first substrate and a first side of the solid-state first electrolyte layer, and a transparent second electrode is disposed between the second substrate and a second side of the solid-state first electrolyte layer, and applying a sealant to (Continued)

seal the solid-state first electrolyte layer between the first and second substrates and to form the EC device.

9 Claims, 9 Drawing Sheets

(51) Int. Cl.
*G02F 1/153* (2006.01)
*G02F 1/1523* (2019.01)
*G02F 1/15* (2019.01)

(52) U.S. Cl.
CPC ............ *G02F 1/1533* (2013.01); *G02F 1/161* (2013.01); *G02F 2001/1555* (2013.01); *G02F 2001/164* (2019.01); *G02F 2202/025* (2013.01)

(56) References Cited

U.S. PATENT DOCUMENTS

| | | | |
|---|---|---|---|
| 9,684,219 B2 | 6/2017 | Garcia et al. | |
| 9,720,299 B1 | 8/2017 | Timmerman et al. | |
| 9,785,031 B2 | 10/2017 | Mattox et al. | |
| 9,791,760 B2 | 10/2017 | Garcia et al. | |
| 9,798,214 B2 | 10/2017 | Garcia et al. | |
| 9,864,250 B2 | 1/2018 | Garcia et al. | |
| 10,156,764 B2 | 12/2018 | Garcia et al. | |
| 10,203,582 B2 | 2/2019 | Garcia et al. | |
| 2002/0110739 A1 | 8/2002 | McEwen et al. | |
| 2002/0136898 A1* | 9/2002 | Nishikitani | C09K 9/02 428/411.1 |
| 2004/0197662 A1 | 10/2004 | Maruyama et al. | |
| 2011/0043885 A1* | 2/2011 | Lamine | B32B 17/10376 359/267 |
| 2011/0122476 A1 | 5/2011 | Zaghib et al. | |
| 2015/0219974 A1 | 8/2015 | Trajkovska-Broach et al. | |
| 2015/0277202 A1 | 10/2015 | Mattox et al. | |
| 2016/0056382 A1 | 2/2016 | Sotzing et al. | |
| 2016/0139475 A1 | 5/2016 | Garcia et al. | |
| 2016/0139476 A1 | 5/2016 | Garcia et al. | |
| 2016/0246153 A1 | 8/2016 | Garcia et al. | |
| 2017/0059957 A1 | 3/2017 | Garcia et al. | |
| 2017/0097551 A1 | 4/2017 | Garcia et al. | |
| 2017/0219904 A1 | 8/2017 | Garcia et al. | |
| 2017/0219905 A1 | 8/2017 | Garcia et al. | |
| 2017/0219906 A1 | 8/2017 | Garcia et al. | |
| 2018/0088431 A1 | 3/2018 | Holt et al. | |
| 2018/0364540 A1 | 12/2018 | Winoto et al. | |

OTHER PUBLICATIONS

U.S. Appl. No. 16/224,134, filed Dec. 18, 2018, Heliotrope Technologies, Inc.

Wu, C.G. et al., "PVdF-HFP/P123 hybrid with mesopores: a new matrix for high-conducting, low-leakage porous polymer electrolyte," Polymer, vol. 46, pp. 5929-5938, (2005).

Michot, T. et al., "Electrochemical Properties of Polymer Gel Electrolytes Based on Poly(vinylidene fluoride) Copolymer and Homopolymer," Electrochimica Acta, vol. 45, pp. 1347-1360, (2000).

Reiter, J. et al., "Electrochromic Devices Employing Methacrylate-Based Polymer Electrolytes," Solar Energy Materials & Solar Cells, vol. 93, pp. 249-255, (2009).

International Search Report and Written Opinion of the International Search Authority for International Patent Application No. PCT/US2019/019733, dated May 30, 2019, 12 pages.

European Patent Office Communication Pursuant to Rule 164(1) EPC and Partial Supplementary European Search Report for European Patent Application No. EP 19765100, dated Nov. 18, 23021, 14 pages.

* cited by examiner

METHODS OF MANUFACTURING ELECTROCHROMIC DEVICES CONTAINING A SOLID-STATE ELECTROLYTE

FIELD

The present invention is generally directed to gel electrolyte precursor compositions, electrochromic (EC) devices including gel electrolytes formed form from the precursor compositions, and methods of manufacturing the same.

BACKGROUND OF THE INVENTION

Residential and commercial buildings represent a prime opportunity to improve energy efficiency and sustainability in the United States. The buildings sector alone accounts for 40% of the United States' yearly energy consumption (40 quadrillion BTUs, or "quads", out of 100 total), and 8% of the world's energy use. Lighting and thermal management each represent about 30% of the energy used within a typical building, which corresponds to around twelve quads each of yearly energy consumption in the US. Windows cover an estimated area of about 2,500 square km in the US and are a critical component of building energy efficiency as they strongly affect the amount of natural light and solar gain that enters a building. Recent progress has been made toward improving window energy efficiency through the use of inexpensive static coatings that either retain heat in cold climates (low emissive films) or reject solar heat gain in warm climates (near-infrared rejection films).

Currently, static window coatings can be manufactured at relatively low cost. However, these window coatings are static and not well suited for locations with varying climates. A window including an electrochromic (EC) device overcomes these limitations by enhancing window performance in all climates.

SUMMARY

According to various embodiments, a method of forming an electrochromic (EC) device includes forming a solid-state first electrolyte layer, after forming the solid-state first electrolyte layer, laminating the first solid-state first electrolyte layer between a transparent first substrate and a transparent second substrate such that a transparent first electrode is disposed between the first substrate and a first side of the solid-state first electrolyte layer, and a transparent second electrode is disposed between the second substrate and a second side of the solid-state first electrolyte layer, and applying a sealant to seal the solid-state first electrolyte layer between the first and second substrates and to form the EC device.

According to various embodiments, a method of forming an electrochromic (EC) device includes forming a first electrode on a transparent first substrate, dispensing an electrolyte precursor composition to form a precursor layer on the first electrode, selectively curing only portions of the precursor composition to form spacers in the precursor layer, laminating the first substrate to a transparent second substrate, and curing the precursor layer to form an electrolyte layer.

DETAILED DESCRIPTION OF THE EXEMPLARY EMBODIMENTS

Figure 1A:
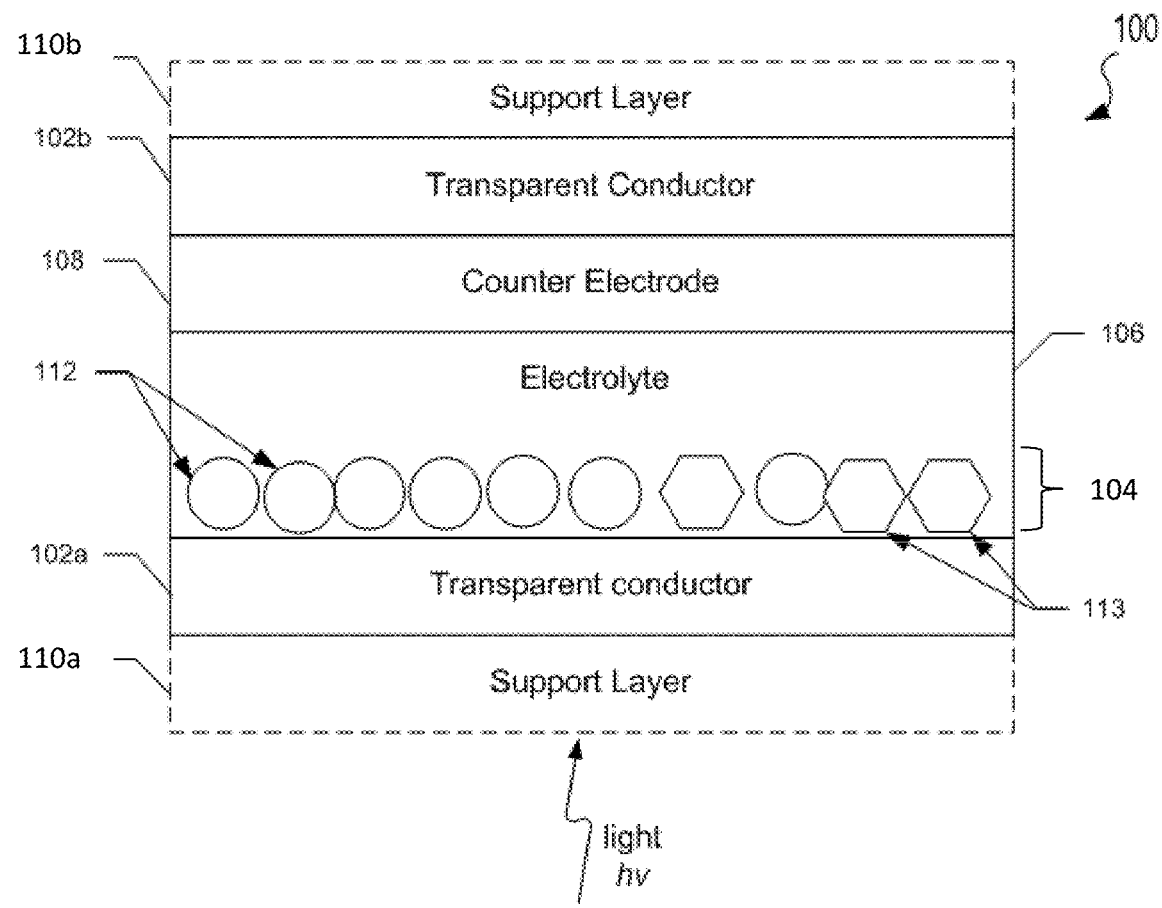
FIGS. 1A-1C are schematic representations of EC devices according to various embodiments.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being disposed "on" or "connected to" another element or layer, it can be directly on or directly connected to the other element or layer, or intervening elements or layers may be present. In contrast, when an element is referred to as being disposed "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint.

Figure 1B:
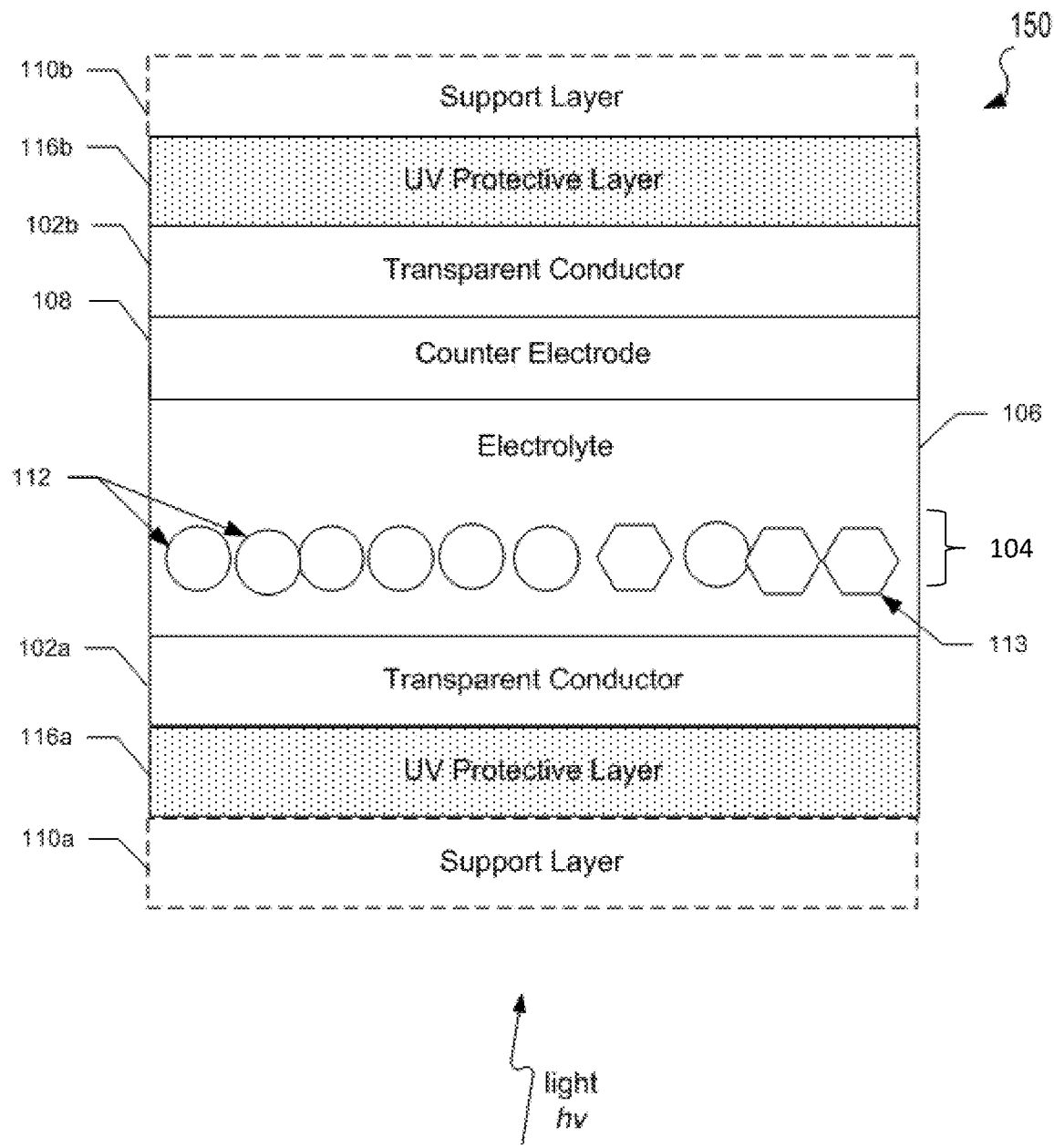
Figure 1C:
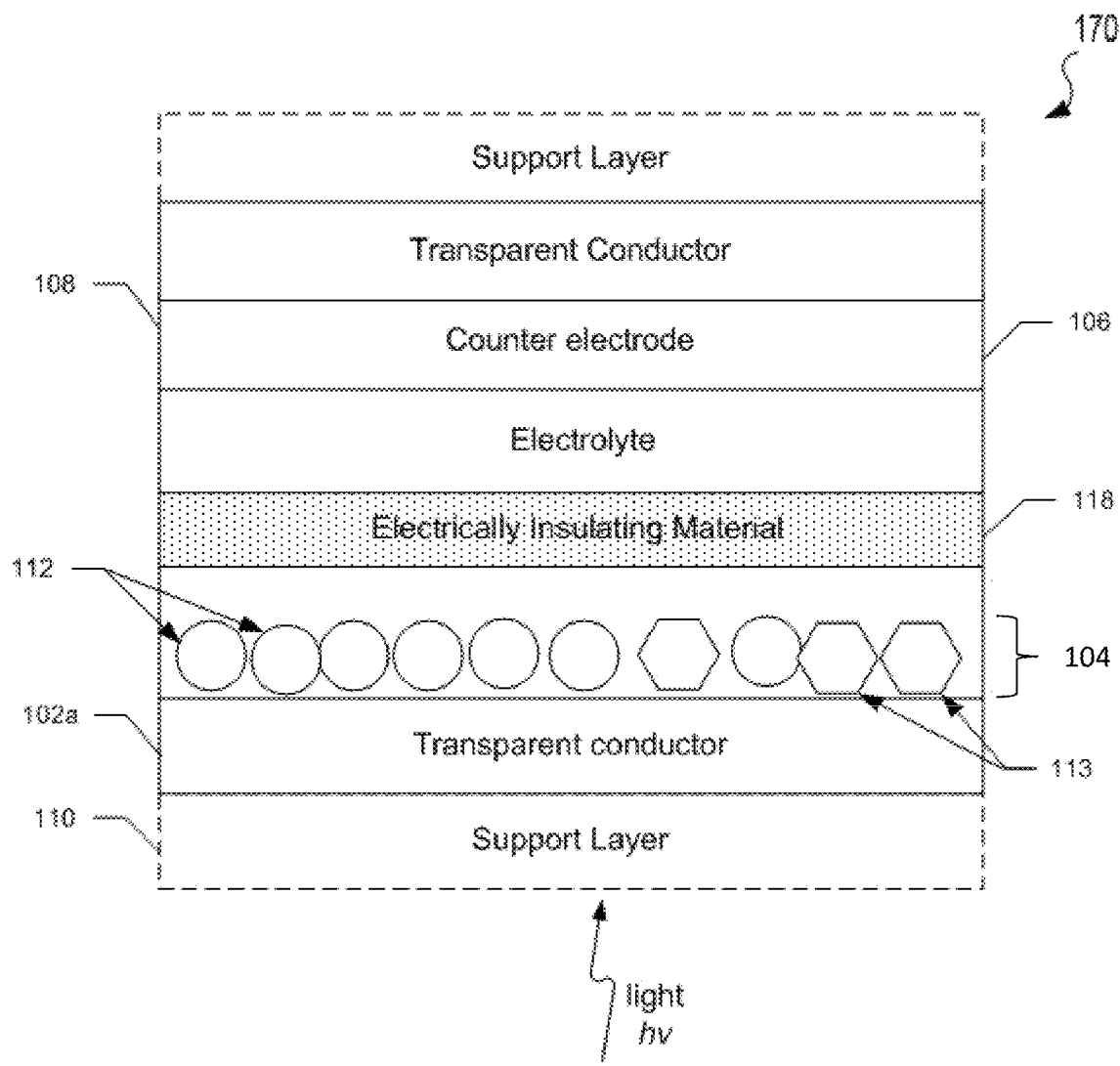

FIGS. 1A-1C illustrate exemplary electrochromic (EC) devices. It should be noted that such EC devices may be oriented upside down or sideways from the orientations illustrated in FIGS. 1A-1C. Furthermore, the thickness of the layers and/or size of the components of the devices in FIGS. 1A-1C are not drawn to scale or in actual proportion to one another other, but rather are shown as representations.

In FIG. 1A, an exemplary EC device 100 may include a first transparent conductor layer 102a, a working electrode 104, a solid-state electrolyte 106, a counter electrode 108, and a second transparent conductor layer 102b. Some embodiment EC devices may also include one or more optically transparent support layers 110a, 110b respectively positioned in front of the first transparent conductor layer 102a and/or positioned behind the second transparent conductor layer 102b. The support layers 110a, 110b may be formed of a transparent material such as glass or plastic.

In various embodiments, the solid-state electrolyte 106 may include at least a structural polymer material and a plasticizer material, such that electrolyte may permeate into crevices between the nanoparticles of the electrodes. The term "solid-state," as used herein with respect to the electrolyte 106, may refer to a polymer-gel and/or any other non-liquid material, such as an electrolyte that is dry and/or substantially free of liquids.

In various embodiments, the electrolyte 106 may be a gel electrolyte including a polymer network (e.g. the structural polymer material or backbone) and an ionically conductive phase disposed therein. The electrolyte 106 may optionally include at least one additive. The term "gel," as used herein with respect to the electrolyte 106, refers to a substantially dilute cross-linked system that exhibits no flow when in the steady-state. By weight, a gel may be mostly liquid, but may behave like a solid due to a three-dimensional cross-linked network within the liquid. The crosslinking within the fluid may give a gel its structure (hardness) and contributes to the adhesive stick (tack).

According to various embodiments, the polymer network may include crosslinked monomers and/or oligomers. Herein, "monomers" monomers refer to both monomers and oligomers. For example, the polymer network may include crosslinked structural monomers and adhesion promoting monomers (e.g., adhesion promoters).

Structural polymers that may be part of the electrolyte 106 may include, but are not limited to, polyurethane acrylate, poly(methyl methacrylate) (PMMA), poly(vinyl butyral-co-vinyl alcohol-co-vinyl acetate) (PVB), poly(ethylene oxide) (PEO), fluorinated co-polymers such as poly(vinylidene fluoride-co-hexafluoropropylene), poly(acrylonitrile) (PAN), poly(vinyl alcohol) (PVA), etc.

In some embodiments, the electrolyte 106 may include a sacrificial redox agent (SRA). Suitable classes of SRAs may include, but are not limited to, alcohols, nitrogen heterocycles, alkenes, and functionalized hydrobenzenes. Specific examples of suitable SRAs may include benzyl alcohol, 4-methylbenzyl alcohol, 4-methoxybenzyl alcohol, dimethylbenzyl alcohol (3,5-dimethylbenzyl alcohol, 2,4-dimethylbenzyl alcohol etc.), other substituted benzyl alcohols, indoline, 1,2,3,4-tetrahydrocarbazole, N,N-dimethylaniline, 2,5-dihydroanisole, etc. In various embodiments, the SRA molecules may create an air stable layer that does not require an inert environment to maintain charge.

The adhesion promoting monomers may include, for example, isobornyl acrylate (IBOA), ethoxylated nonylphenol acrylate, poly(ethylene glycol) diacrylate (PEGDA), poly(ethylene glycol) dimethacrylate (PEGDMA), trimethylolpropane triacrylate (TMPTA), ethoxyethoxyethyl acrylate, tripropylene glycol diacrylate (TPGDA), butyl acrylate (BA), hexanediol diacrylate (HDDA), and mixtures thereof. The adhesion promoting monomers may be configured to promote electrolyte adhesion between the structural monomers, and between the electrolyte 106 and an adjacent substrate, such as the transparent conductor 102a and/or the counter electrode 108.

The ionically conductive phase may be disposed within the polymer network. The ionically conducting phase may include a solvent, a plasticizer, an electrolyte salt, and/or an initiator. In some embodiments, the ionically conductive phase may include one or more optional additives, such as sacrificial redox agents (SRA).

In some embodiments, the electrolyte salt may include, for example, an ion species selected from the group of lanthanides (e.g., cerium, lanthanum, praseodymium, neodymium, promethium, samarium, europium, gadolinium, terbium, dysprosium, holmium, erbium, thulium, ytterbium, and lutetium), alkali metals (e.g., lithium, sodium, potassium, rubidium, and cesium), and alkali earth metals (e.g., beryllium, magnesium, calcium, strontium, and barium). In an exemplary embodiment, the electrolyte salt may contain a lithium and/or sodium ions. In various embodiments, the lithium salt may be, for example, lithium bis(trifluoromethanesulfonyl)imide (LiTFSI), lithium tetrafluoroborate (LiBF$_4$), lithium bis(oxalate)borate (LiBOB), lithium hexafluorophosphate (LiPF$_6$), lithium difluorooxalatoborate (LiDFOB), or mixtures thereof.

In some embodiments, the plasticizer may include glymes (tetraglyme, triglyme, diglyme etc.), propylene carbonate, ethylene carbonate, ionic liquids (1-ethyl-3-methylimidazolium tetrafluoroborate, 1-butyl-3-methylimidazolium hexafluorophosphate, 1-butyl-3-methylimidazolium bis(trifluoromethane sulfonyl) imide, 1-butyl-1-methyl-pyrrolidinium bis(trifluoromethane sulfonyl)imide, etc.), N,N-dimethylacetamide, and mixtures thereof. In an embodiment, the plasticizer may include at least one of tetraglyme and an alkyl hydroperoxide.

In various embodiments, the plasticizer may include an ionic liquid. For example, the plasticizer may include N-methyl-N-butylpyrrolidinium bis(trifluoromethylsulfonyl)imide (Py14TFSI), imidazolium bis(trifluoromethylsulfonyl)imide ([Im][TFSI]), butyltrimethylammonium bis(trifluoromethylsulfonyl)imide, 1-methyl-1-propylpiperidinium bis(trifluoromethylsulfonyl)imide, 1-butyl-1-methylpiperidinium bis(trifluoromethylsulfonyl) imide, n-ethyl-N,N-dimethyl-2-methoxyethylammonium bis(trifluoromethylsulfonyl)imide, 1-(3-methoxypropyl)-1-methylpiperidinium bis(trifluoromethylsulfonyl)imide, N-(3-hydroxypropyl)pyridinium bis(trifluoromethylsulfonyl)imide, 1-hexyl-1-methylpyrrolidinium bis(trifluoromethylsulfonyl)imide, trihexyltetradecylphosphonium tris(pentafluoroethyl)trifluorophosphate, N-methoxyethyl-N-methylmorpholinium bis(trifluoromethylsulfonyl)imide, propylene carbonate, sulfolane, or a combination thereof.

In some embodiments, the plasticizer may also include solvent. The solvent may include, for example, tetraglyme, propylene carbonate, N-methyl-2-pyrrolidone (NMP), acetonitrile, water, or mixtures thereof. The solvent may be mixed with the ionic liquid. In some embodiments, the electrolyte 106 may initially contain a solvent, such as butanol, which may be evaporated off once the electrochromic device is assembled.

In some embodiments, the electrolyte 106 may initially contain a solvent, such as butanol, which may be evaporated off once the electrochromic device is assembled. In some embodiments, the electrolyte 106 may be around 40-60 wt % plasticizer material, preferably around 50-55 wt % plasticizer material. In an embodiment, the plasticizer material may include at least one of tetraglyme and an alkyl hydroperoxide. In an embodiment, the polymer material of the solid-state electrolyte 106 may be polyvinylbutyral (PVB), and the salt may be lithium bis(trifluoromethane). In other embodiments, the electrolyte 106 may include at least one of lithium phosphorus oxynitride (LiPON) and tantalum pentoxide (Ta$_2$O$_5$).

In some embodiments, the electrolyte 106 may include, by weight, 10-30% polymer, 40-80% plasticizer, 5-25% lithium salt, and 0.5-10% SRA.

The electrolyte 106 may be formed by curing an electrolyte precursor composition. The electrolyte precursor composition, which may also be referred to as a "precursor composition", may be cured by the application of heat and/or UV light. Herein, the "electrolyte precursor composition" and "precursor composition" may refer to flowable liquid compositions that are not cross-linked, or are partially crosslinked (e.g., at least 50% of the crosslinkable polymers and/or oligomers remain un-crosslinked), but that may be cured to form a gel electrolyte.

The precursor composition may include polymer network precursors (e.g., structural monomers and adhesion promoting monomers used to form the polymer network) and an ionically conducting phase. The ionically conducting phase may include a solvent, a plasticizer, an electrolyte salt, an initiator, optionally one or more additives, and any combinations thereof.

In various embodiments, the curing may be facilitated by the initiator. The initiator may include, for example, 2,2-Dimethoxy-2-phenylacetophenone, benzoyl peroxide, phenylphosphineoxide, or a mixture thereof.

In some embodiments, the precursor composition may include a viscosity controlling agent, such as a thickener, to increase the viscosity thereof. For example, the precursor composition may have a viscosity ranging from about 1,000 cP to about 90,000 cP, at room temperature. For example, the viscosity may range from about 10,000 cP to about 80,000 cP, such as from about 25,000 cP to about 60,000 cP.

The first and second transparent conductor layers 102a, 102b may be formed from transparent conducting films fabricated using inorganic and/or organic materials. For example, the transparent conductor layers 102a, 102b may include inorganic films of transparent conducting oxide (TCO) materials, such as indium tin oxide (ITO) or fluorine doped tin oxide (FTO). In other examples, organic films in transparent conductor layers 102a, 102b may include graphene and/or various polymers.

In the various embodiments, the working electrode 104 may include nanostructures 112 of a doped or undoped transition metal oxide bronze, and optionally nanostructures 113 of a transparent conducting oxide (TCO) composition shown schematically as circles and hexagons for illustration purposes only. As discussed above, the thickness of the layers of the device 100, including and the shape, size and scale of nanostructures is not drawn to scale or in actual proportion to each other, but is represented for clarity. In the various embodiments, nanostructures 112, 113 may be embedded in an optically transparent matrix material or provided as a packed or loose layer of nanostructures exposed to the electrolyte.

In the various embodiments, the doped transition metal oxide bronze of nanostructures 112 may be a ternary composition of the type $A_xM_zO_y$, where M represents a transition metal ion species in at least one transition metal oxide, and A represents at least one dopant. Transition metal oxides that may be used in the various embodiments include, but are not limited to any transition metal oxide which can be reduced and has multiple oxidation states, such as niobium oxide, tungsten oxide, molybdenum oxide, vanadium oxide, titanium oxide and mixtures of two or more thereof. In one example, the nanostructured transition metal oxide bronze may include a plurality of undoped tungsten oxide ($WO_{3-x}$) nanoparticles, where $0 \leq x \leq 0.33$, such as $0 \leq x \leq 0.1$.

In various embodiments, the at least one dopant species may be a first dopant species that, upon application of a particular first voltage range, causes a first optical response. The applied voltage may be, for example, a negative bias voltage. Specifically, the first dopant species may cause a surface plasmon resonance effect on the transition metal oxide by creating a significant population of delocalized electronic carriers. Such surface plasmon resonance may cause absorption of NIR radiation at wavelengths of around 780-2000 nm, with a peak absorbance at around 1200 nm. In various embodiments, the specific absorbances at different wavelengths may be varied/adjusted based other factors (e.g., nanostructure shape, size, etc.), discussed in further detail below. In the various embodiments, the first dopant species may be an ion species selected from the group of cesium, rubidium, and lanthanides (e.g., cerium, lanthanum, praseodymium, neodymium, promethium, samarium, europium, gadolinium, terbium, dysprosium, holmium, erbium, thulium, ytterbium, and lutetium).

In various embodiments, the dopant may include a second dopant species that causes a second optical response based upon application of a voltage within a different, second particular range. The applied voltage may be, for example, a negative bias voltage. In an embodiment, the second dopant species may migrate between the electrolyte 106 and the nanostructured transition metal oxide bronze of the working electrode 104 as a result of the applied voltage. Specifically, the application of voltage within the particular range may cause the second dopant species to intercalate and deintercalate the transition metal oxide structure. In this manner, the second dopant may cause a change in the oxidation state of the transition metal oxide, which may cause a polaron effect and a shift in the lattice structure of the transition metal oxide. This shift may cause absorption of visible radiation, for example, at wavelengths of around 400-780 nm.

In various embodiments, the second dopant species may be an intercalation ion species selected from the group of lanthanides (e.g., cerium, lanthanum, praseodymium, neodymium, promethium, samarium, europium, gadolinium, terbium, dysprosium, holmium, erbium, thulium, ytterbium, and lutetium), alkali metals (e.g., lithium, sodium, potassium, rubidium, and cesium), and alkali earth metals (e.g., beryllium, magnesium, calcium, strontium, and barium). In other embodiments, the second dopant species may include a charged proton species.

In various embodiments, nanostructures 113 may optionally be mixed with the doped transition metal oxide bronze nanostructures 112 in the working electrode 104. In the various embodiments, the nanostructures 113 may include at least one TCO composition, which prevents UV radiation from reaching the electrolyte and generating electrons. In an example embodiment, the nanostructures 113 may include an indium tin oxide (ITO) composition, which may be a solid solution of around 60-95 wt % (e.g., 85-90 wt %) indium(III) oxide ($In_2O_3$) and around 5-40 wt % (e.g., 10-15 wt %) tin(IV) oxide ($SnO_2$). In another example embodiment, the nanostructures 113 may include an aluminum-doped zinc oxide (AZO) composition, which may be a solid solution of around 99 wt % zinc oxide (ZnO) and around 2 wt % aluminum(III) oxide ($Al_2O_3$). Additional or alternative TCO compositions that may be used to form nanostructures 113 in the various embodiments include, but are not limited to, indium oxide, zinc oxide and other doped zinc oxides such as gallium-doped zinc oxide and indium-doped zinc oxide.

The TCO composition of nanostructures 113 may be transparent to visible light/radiation and, upon application of the first voltage, may modulate absorption of NIR radiation at wavelengths of around 1200-2500 nm, with peak absorbance around 2000 nm (e.g., at a longer peak wavelength than the bronze nanoparticles 112, but with overlapping absorption bands). In particular, application of the first voltage may cause an increase in free electron charge carriers, and therefore cause a surface plasmon resonance effect in at least one TCO composition of nanostructures 113. In an embodiment in which the TCO composition is ITO, the surface plasmon resonance effect may be caused by oscillation of free electrons produced by the replacement of indium ions ($In^{3+}$) with tin ions ($Sn^{4+}$). Similar to the transition metal oxide bronze, such surface plasmon resonance may cause a change in absorption properties of the TCO material. In some embodiments, the change in absorption properties may be an increase in absorbance of NIR radiation at wavelengths that overlaps with that of the nanostructures 112. Therefore, the addition of TCO composition nanostructures 113 to the working electrode 104 may serve to expand the range of NIR radiation absorbed (e.g., at wavelengths of around 780-2500 nm) compared to that of the nanostructures 112 alone (e.g., at wavelengths of around 780-2000 nm), and to enhance absorption of some of that NIR radiation (e.g., at wavelengths of around 1200-2000 nm).

Based on these optical effects, the nanostructure 112 and optional nanostructure 113 of the working electrode may progressively modulate transmittance of NIR and visible radiation as a function of applied voltage by operating in at least three different modes. For example, a first mode may be a highly solar transparent ("bright") mode in which the working electrode 104 is transparent to NIR radiation and visible light radiation. A second mode may be a selective-IR blocking ("cool") mode in which the working electrode 104 is transparent to visible light radiation but absorbs NIR radiation. A third mode may be a visible blocking ("dark") mode in which the working electrode 104 absorbs radiation in the visible spectral region and at least a portion of the NIR spectral region. In an example, application of a first voltage having a negative bias may cause the electrochromic device to operate in the cool mode, blocking transmittance of NIR radiation at wavelengths of around 780-2500 nm. In another example, application of a second negative bias voltage having a higher absolute value than the first voltage may cause the electrochromic device to operate in the dark state, blocking transmittance of visible radiation (e.g., at wavelengths of around 400-780 nm) and NIR radiation at wavelengths of around 780-1200 nm. In another example, application of a third voltage having a positive bias may cause the electrochromic device to operate in the bright state, allowing transmittance of radiation in both the visible and NIR spectral regions. In various embodiments, the applied voltage may be between −5V and 5V, preferably between −2V and 2V. For example, the first voltage may be −0.25V to −0.75V, and the second voltage may be −1V to −2V. In another example, the absorbance of radiation at a wavelength of 800-1500 nm by the electrochromic device may be at least 50% greater than its absorbance of radiation at a wavelength of 450-600 nm.

Alternatively, the nanostructure 112 and optional nanostructure 113 of the working electrode may modulate transmittance of NIR and visible radiation as a function of applied voltage by operating in two different modes. For example, a first mode may be a highly solar transparent ("bright") mode in which the working electrode 104 is transparent to NIR radiation and visible light radiation. A second mode may be a visible blocking ("dark") mode in which the working electrode 104 absorbs radiation in the visible spectral region and at least a portion of the NIR spectral region. In an example, application of a first voltage having a negative bias may cause the electrochromic device to operate in the dark mode, blocking transmittance of visible and NIR radiation at wavelengths of around 780-2500 nm. In another example, application of a second voltage having a positive bias may cause the electrochromic device to operate in the bright mode, allowing transmittance of radiation in both the visible and NIR spectral regions. In various embodiments, the applied voltage may be between −2V and 2V. For example, the first voltage may be −2V, and the second voltage may be 2V.

In other embodiments, no dopants may be included in the nanostructures 112, other than lithium ions intercalated during operation, and/or the nanostructures 113 may be omitted. For example, an electrochromic device may only have bright and dark modes.

The electrolyte 106 may permeate into crevices between the transition metal oxide bronze nanoparticles 112 (and/or nanoparticles 113 if present). The counter electrode 108 of the various embodiments should be capable of storing enough charge to sufficiently balance the charge needed to cause visible tinting to the nanostructured transition metal oxide bronze in the working electrode 104. In various embodiments, the counter electrode 108 may be formed as a conventional, single component film, a nanostructured film, or a nanocomposite layer.

In some embodiments, the counter electrode 108 may be formed from at least one passive material that is optically transparent to both visible and NIR radiation during the applied biases. Examples of such passive counter electrode materials may include $CeO_2$, $CeVO_2$, $TiO_2$, indium tin oxide, indium oxide, tin oxide, manganese or antimony doped tin oxide, aluminum doped zinc oxide, zinc oxide, gallium zinc oxide, indium gallium zinc oxide, molybdenum doped indium oxide, $Fe_2O_3$, and/or $V_2O_5$. In other embodiments the counter electrode 108 may be formed from at least one complementary material, which may be transparent to NIR radiation but which may be oxidized in response to application of a bias, thereby causing absorption of visible light radiation. Examples of such complementary counter electrode materials may include $Cr_2O3$, $MnO_2$, $FeO_2$, $CoO_2$, $NiO_2$, $RhO_2$, or $IrO_2$. The counter electrode materials may include a mixture of one or more passive materials and/or one or more complementary materials described above.

Without being bound to any particular theory, it is believed that the application of a first voltage in the various embodiments may cause the interstitial dopant species (e.g., cesium) in the crystal structure of the transition metal oxide bronze to have a greater amount of free carrier electrons and/or to cause the interstitial dopant species (e.g., lithium ions from the electrolyte) to perform non-faradaic capacitive or pseudo-capacitive charge transfer on the surface of the nanostructures 112, which may cause the surface plasmon resonance effect to increase the absorption of NIR radiation. In this manner, the absorption properties of the transition metal oxide bronze characteristics may change (i.e., increased absorption of NIR radiation) upon application of the first voltage. Further, application of a second voltage having a higher absolute value than the first voltage in the various embodiments may cause faradaic intercalation of an intercalation dopant species (e.g., lithium ions) from the electrolyte into the transition metal oxide nanostructures. It is believed that the interaction of this dopant species provides interstitial dopant atoms in the lattice which creates a polaron effect. In this manner, the lattice structure of transition metal oxide nanoparticles may experience a polaron-type shift, thereby altering its absorption characteristics (i.e., shift to visible radiation) to block both visible and near infrared radiation.

In some embodiments, in response to radiation of certain spectral regions, such as UV (e.g., at wavelengths of around 10-400 nm) may cause excitons to be generated in the polymer material of the electrolyte 106. The UV radiation may also excite electrons in the doped transition metal oxide bronze to move into the conduction band, leaving holes in the valence band. The generated excitons in the polymer material may dissociate to free carriers, the electrons of which may be attracted to the holes in the valence band in the doped transition metal oxide bronze (e.g., cesium-doped tungsten trioxide ($Cs_xWO_3$)) of nanoparticles 112. Since electrochemical reduction of various transition metal oxide bronzes by such free electron charge carriers may degrade their performance (i.e., from unwanted coloration of the transition metal oxide bronze), embodiment devices may include one or more layer of a protective material to prevent UV radiation from reaching the electrolyte 106, in addition to or instead of nanostructures 113 mixed into the working electrode.

FIG. 1B illustrates an embodiment electrochromic device 150 that addresses degradation of the doped transition metal oxide bronze nanostructures 112. Similar to device 100 shown in FIG. 1A, device 150 may include a first transparent conductor layer 102a, a working electrode 104, a solid-state electrolyte 106, a counter electrode 108, a second transparent conductor layer 102b, and one or more optically transparent support layers 110a, 110b. In addition, device 150 may include one or more protective layers 116a, 116b made of a material that absorbs UV radiation. In an example embodiment, the device 150 may include a first protective layer 116a disposed between a first support layer 110a and the first transparent conductor layer 102a. The device may optionally include a second protective layer 116b disposed between a second support layer 110b and the second transparent conductor layer 102b. Alternatively, the UV protective layer 116a may be disposed on the exterior surface of the first support layer 110a, or may be disposed between the first transparent conductor 102a and the working electrode 104. In other words, the first and/or second UV protective layers 116a, 116b may be disposed between any of the layers of the electrochromic device 150, such that UV radiation is substantially prevented from reaching the working electrode 104.

The UV radiation absorbing material of the one or more protective layers 116a, 116b of the various embodiments may be any of a number of barrier films. For example, the one or more protective layers 116a, 116b may be a thin film of at least one TCO material, which may include a same as or different from TCO compositions in the nanostructures 113. In an example embodiment, a protective layer 116a of the device 150 may be an ITO thin film, and therefore capable of absorbing UV radiation by band-to-band absorption (i.e., absorption of a UV photon providing enough energy to excite an electron from the valence band to the conduction band). In another example embodiment, the device may include the TCO nanostructures 113 made of ITO, as well as a protective layer 116a composed of an ITO thin film. Alternatively, the TCO nanostructures 113 may form a separate thin film layer 116b disposed between the transition metal oxide bronze nanoparticles 112 and the transparent conductor 102a. In some embodiments, the UV radiation absorbing materials of protective layers 116a, 116b may include organic or inorganic laminates.

In another embodiment, at least one UV protective layer, such as protective layer 116a in FIG. 1B, may be a UV radiation reflector made of a high index transparent metal oxide. Since birds can see radiation in the UV range, a UV reflector may be implemented in embodiments positioned as outside windows in order to prevent birds from hitting the windows. In some other embodiments, UV radiation absorbing organic molecules and/or inorganic UV radiation absorbing nanoparticles (e.g., zinc oxide, indium oxide, ITO, etc.) may be incorporated within the electrolyte 106 material.

FIG. 1C illustrates another embodiment electrochromic device 170 that addresses degradation of the doped transition metal oxide bronze nanostructures 112 by controlling the effects of the electron charge carriers generated in the electrolyte from exposure to UV radiation. Similar to devices 100 and 150 discussed above with respect to FIGS. 1A and 1B respectively, device 170 may include a first transparent conductor layer 102a, a working electrode 104, a solid-state electrolyte 106, a counter electrode 108, a second transparent conductor layer 102b, and one or more optically transparent support layers 110a, 110b. In addition, device 170 may include a protective layer 118 positioned between the working electrode 104 and the electrolyte 106. The protective layer 118 may be composed of one or more ionically conductive and electrically insulating material.

As discussed above, without being bound to any particular theory, it is believed that the migration of intercalation ions between the electrolyte 106 and the working electrode 104 is responsible for at least some of the device's capability to modulate spectral absorption. Therefore, in order to maintain operability of the device, the electrically insulating material used to form the protective layer 118 should also be ionically conductive. That is, the material of the protective layer 118 may prevent or reduce free electrons in the electrolyte 106 from reducing the transition oxide bronze of nanoparticles 112, while allowing the diffusion of ions of an intercalation dopant species (e.g., Na, Li, etc.) between the electrolyte 106 and working electrode 104. In an example embodiment, the electrically insulating material that makes up the protective layer 118 may be tantalum oxide, such as tantalum pentoxide ($Ta_2O_5$) and/or perovskite LiPON, which blocks migration of electrons from the electrolyte 106 while allowing diffusion of the intercalation dopant species ions (e.g., lithium ions) from the electrolyte 106. In this manner, degradation of the transition metal oxide bronze is reduced or prevented by controlling the effect of the absorbed UV radiation in addition to or instead of instead of blocking its absorption. Other example materials that may be used to form the protective layer 118 in addition to or instead of tantalum pentoxide may include, without limitation, strontium titanate ($SrTiO_3$), zirconium dioxide ($ZrO_2$), indium oxide, zinc oxide, tantalum carbide, niobium oxide, and various other dielectric ceramics having similar electrical and/or crystalline properties to tantalum pentoxide.

In an alternative embodiment, instead of or in addition to the protective layer 118, the nanostructures 112 may each be encapsulated in a shell containing an electrically insulating and ionically conductive material, which may be the same as or different from the material of the protective layer 118 (e.g., tantalum oxide, strontium titanate, zinc oxide, indium oxide, zirconium oxide, tantalum carbide, or niobium oxide). In an example embodiment, each nanostructure 112 may have a core of cubic or hexagonal unit cell lattice structure tungsten bronze, surrounded by a shell of tantalum pentoxide.

In some embodiments, the electrolyte 106 may include a polymer that reduces damage to the device due to UV radiation. The polymer may be any of a number of polymers that are stable upon absorption of UV radiation (e.g., no creation of proton/electron pairs). Examples of such polymers may include, but are not limited to, fluorinated polymers without hydroxyl (—OH) groups (e.g., polyvinylidene difluoride (PVDF)).

In another embodiment, a positive bias may be applied to the counter electrode 108 to draw UV radiation generated electrons from the electrolyte 106 to the counter electrode 108 in order to reduce or prevent electrons from the electrolyte 106 from moving to the working electrode 104 to avoid the free electron-caused coloration of the doped transition metal oxide bronze in the working electrode 104.

In another embodiment, a device may include none or, one of, or more than one of, such as any two of, any three of, or all four of: (i) a protective layer of electrically insulating material (e.g., protective layer 118 or protective material shells around the bronze nanoparticles), (ii) one or more protective layer of UV radiation absorbing material (e.g., protective layer(s) 116a and/or 116b in FIG. 1B and/or UV radiation absorbing organic molecules and/or inorganic UV radiation absorbing nanoparticles incorporated within the electrolyte 106 material), (iii) electrolyte polymer that is stable upon absorption of UV radiation, and/or (iv) application of positive bias to the counter electrode 108. In various embodiments, the nanostructures 113 may be included in or omitted from electrochromic devices 150, 170.

In another embodiment, the protective layer(s) 116a and/or 116b may comprise a stack of metal oxide layers. Alternatively, the stack may comprise a separate component that is provided instead of or in addition to the layer(s) 116a and/or 116b. The stack may provide improvement in the reflected color of the electrochromic device. Prior art devices generally have a reddish/purplish color when viewed in reflection. The stack may comprise index-matched layers between the glass and transparent conductive oxide layer to avoid the reddish/purplish reflected color. As noted above, the index-matched layer can serve as the UV absorber or be used in addition to another UV absorber. The stack may comprise a zinc oxide based layer (e.g., ZnO or AZO) beneath an indium oxide based layer (e.g., indium oxide or ITO).

Compared to nanocomposite electrochromic films, the various embodiments may involve similar production by utilizing a single nanostructured material in the working electrode to achieve the desired spectral absorption control in both NIR and visible regions, and another nanostructured material to enhance and expand such control in the NIR region. Further, the various embodiments may provide one or more additional layer(s) of a protective material to minimize degradation of the single nanostructured material.

In some embodiments, the working electrode 104 and/or the counter electrode 108 may additionally include at least one material, such as an amorphous nanostructured material, that enhances spectral absorption in the lower wavelength range of the visible region. In some embodiments, the at least one amorphous nanostructured material may be at least one nanostructured amorphous transition metal oxide.

In particular, the amorphous nanostructured materials may provide color balancing to the visible light absorption that may occur due to the polaron-type shift in the spectral absorption of the doped-transition metal oxide bronze. As discussed above, upon application of the second voltage having a higher absolute value, the transition metal oxide bronze may block (i.e., absorb) radiation in the visible range. In various embodiments, the absorbed visible radiation may have wavelengths in the upper visible wavelength range (e.g., 500-700 nm), which may cause the darkened layer to appear blue/violet corresponding to the un-absorbed lower visible wavelength range (e.g., around 400-500 nm). In various embodiments, upon application of the second voltage, the at least one nanostructured amorphous transition metal oxide may absorb complementary visible radiation in the lower visible wavelength range (e.g., 400-500 nm), thereby providing a more even and complete darkening across the visible spectrum with application of the second voltage. That is, use of the amorphous nanostructured material may cause the darkened layer to appear black.

In some embodiments, at least one nanostructured amorphous transition metal oxide may be included in the working electrode 104 in addition to the doped-transition metal oxide bronze nanostructures 112 and the optional TCO nanostructures 113. An example of such material in the working electrode 104 may be, but is not limited to, nanostructured amorphous niobium oxide, such as niobium(II) monoxide (NbO) or other niobium oxide materials (e.g., $NbO_x$). In some embodiments, the counter electrode 108 may include, as a complementary material, at least one nanostructured amorphous transition metal oxide. That is, in addition to optically passive materials, the counter electrode 108 may include at least one material for color balancing (i.e., complementing) the visible radiation absorbed in the working electrode (i.e., by the transition metal oxide bronze. An example of such material in the counter electrode 108 may be, but is not limited to, nanostructured amorphous nickel oxide, such as nickel(II) oxide (NiO) or other nickel oxide materials (e.g., $NiO_x$).

In the various embodiments, nanostructures that form the working and/or counter electrode, including the at least one amorphous nanostructured material, may be mixed together in a single layer. An example of a mixed layer is shown in FIG. 1A with respect to transition metal oxide bronze nanostructures 112 and TCO nanostructures 113. Alternatively, nano structures that form the working and/or counter electrode, including the at least one amorphous nanostructured material, may be separately layered according to composition. For example, a working electrode may include a layer of amorphous $NbO_x$ nanostructures, a layer of transition metal oxide bronze nanostructures, and a layer of ITO nanostructures, in any of a number of orders.

The nanostructured transition metal oxide bronzes that may be part of the working electrode 104 in various embodiment devices can be formed using any of a number of low cost solution process methodologies. For example, solutions of $Nb:TiO_2$ and $Cs_xWO_3$ may be synthesized using colloidal techniques. Compared to other synthetic methodologies, colloidal synthesis may offer a large amount of control over the nanostructure size, shape, and composition of the nanostructured transition metal oxide bronze. After deposition, a nanostructured transition metal oxide bronze material in the working electrode 104 may be subjected to a thermal post treatment in air to remove and cap ligands on the surface of the nanostructures.

In various embodiments, nanostructured amorphous transition metal oxide materials may be formed at room temperature from an emulsion and an ethoxide precursor. For example, procedures used to synthesize tantalum oxide nanoparticles that are described in "Large-scale synthesis of bioinert tantalum oxide nanoparticles for X-ray computed tomography imaging and bimodal image-guided sentinel lymph node mapping" by MH Oh et al. (J Am Chem Soc. 2011 Apr. 13; 133(14):5508-15), incorporated by reference herein, may be similarly used to synthesize amorphous transition metal oxide nanoparticles. For example, an overall synthetic process of creating the nanoparticle, as described in Oh et al., may adopted from the microemulsion synthesis of silica nanoparticles. In such process, a mixture of cyclohexane, ethanol, surfactant, and a catalysis for the sol-gel reaction may be emulsified. The ethoxide precursor may be added to the emulsion, and uniform nanoparticles may be formed by a controlled-sol gel reaction in the reverse micelles at room temperature within around 5 minutes. The sol-gel reaction may be catalyzed, for example, by NaOH.

In some embodiments, the nanostructured amorphous transition metal oxide may be sintered at a temperature of at least 400° C. for at least 30 minutes, such as 400 to 600° C. for 30 to 120 minutes to form a porous web. In an example embodiment, the porous web may be included in a working electrode 104, with the tungsten bronze nanoparticles and ITO nanoparticles incorporated in/on the web. Alternatively, the sintering step may be omitted and the nano structured amorphous transition metal oxide may remain in the device in the form of nanoparticles having amorphous structure. In this embodiment, the device containing the nanostructured amorphous transition metal oxide may include or may omit the protective layer(s) 116a, 116b, and 118, the UV stable electrolyte polymer, and the application of positive bias to the counter electrode.

Electrochromic responses of prepared nano structured transition metal oxide bronze materials (e.g., $Cs_xWO_3$, $Nb:TiO_2$, etc.) may be demonstrated by spectro-electrochemical measurements.

In various embodiments, the shape, size, and doping levels of nanostructured transition metal oxide bronzes may be tuned to further contribute to the spectral response by the device. For instance, the use of rod versus spherical nanostructures 112 may provide a wider level of porosity, which may enhance the switching kinetics. Further, a different range of dynamic plasmonic control may occur for nanostructures with multiple facets, such as at least 20 facets.

Various embodiments may also involve alternation of the nanostructures 112 that form the working electrode 104. For example, the nanostructures may be nanoparticles of various shapes, sizes and/or other characteristics that may influence the absorption of NIR and/or visible light radiation. In some embodiments, the nanostructures 112 may be isohedrons that have multiple facets, preferably at least 20 facets.

In some embodiments, the transition metal oxide bronze nanostructures 112 may be a combination of nanoparticles having a cubic unit cell crystal lattice ("cubic nanoparticles") and nanoparticles having a hexagonal unit cell crystal lattice ("hexagonal nanoparticles"). Each unit cell type nanoparticle contributes to the performance of the working electrode 104. For example, the working electrode 104 may include both cubic and hexagonal cesium doped tungsten oxide bronze nanoparticles. In alternative embodiments, the working electrode 104 may include either cubic or hexagonal cesium doped tungsten oxide nanoparticles. For example, the working electrode 104 may include cubic cesium-doped tungsten oxide (e.g. $Cs_1W_2O_{6-x}$) nanoparticles and amorphous niobium oxide nanoparticles or hexagonal cesium-doped tungsten oxide (e.g. $Cs_{0.29}W_1O_3$) nanoparticles without niobium oxide. In alternative embodiments, the working electrode 104 may include undoped tungsten oxide (e.g. $WO_{3-x}$) nanoparticles where $0 \le x \le 0.33$, such as $0 < x \le 0.17$, including $0 < x \le 0.1$.

For example, upon application of the first (i.e., lower absolute value) voltage described above, the hexagonal bronze nanostructures 112 may block NIR radiation having wavelengths in the range of around 800-1700 nm, with the peak absorption at the mid-NIR wavelength of around 1100 nm. The cubic bronze nanostructures 112 may block NIR radiation having wavelengths in the close-NIR range with the peak absorption of around 890 nm. The indium oxide based (including ITO) and/or zinc oxide based (including AZO) nanostructures 113 may be included in the working electrode 104 to block the higher wavelength IR radiation upon application of the first voltage. Thus, the cubic bronze and hexagonal bronze nanostructures may block respective close and mid-NIR radiation (e.g., using the Plasmon effect), while the nanostructures 113 may block the higher wavelength IR radiation.

Upon application of the second (i.e., higher absolute value) voltage described above, the cubic bronze nanostructures 112 may block visible and NIR radiation having wavelengths in the range of around 500-1500 nm, with the peak absorption at the close-NIR wavelength of around 890 nm (e.g., using the polaron effect). Optionally, the amorphous niobium oxide may also be added to the working electrode 104 to block the short wavelength visible radiation (e.g., 400 to 500 nm wavelength).

The cubic bronze nanostructures block visible radiation via the polaron effect at a lower applied voltage than the hexagonal bronze nanostructures. Thus, the second voltage may have an absolute value which is below the value at which the hexagonal bronze nano structures block visible radiation via the polaron effect such that these nanostructures do not contribute to blocking of visible radiation. Alternatively, the second voltage may have an absolute value which is above the value at which the hexagonal bronze nanostructures block visible radiation via the polaron effect such that these nanostructures also contribute to blocking of visible radiation.

Embodiment nanoparticles that form the working electrode 104 may be around 4-6 nm in diameter, and may include 40 to 70 wt %, such as around 50 wt % cubic tungsten bronze nanostructures, 15 to 35 wt %, such as around 25 wt % hexagonal tungsten bronze nanostructures, and optionally 15 to 35 wt %, such as around 25 wt % ITO nanostructures. In some embodiments, in order to achieve color balancing as described above, the nanoparticles that form the working electrode 104 may optionally include around 5-10 wt % amorphous $NbO_x$ nanostructures in place of cubic tungsten bronze nanostructures. In this embodiment, the device containing two types of bronze nanoparticles may include or may omit the protective layer(s) 116a, 116b, and 118, the UV stable electrolyte polymer, the application of positive bias to the counter electrode, and the amorphous niobium oxide.

In summary, the working electrode 104 may include one or more of the following components:
  (a) metal oxide bronze nanostructures 112 having (i) a cubic, (ii) hexagonal, or (iii) a combination of cubic and hexagonal unit cell lattice structure;
  (b) protective (i) indium oxide based (including ITO) and/or zinc oxide based (including AZO) nanostructures 113;
  (c) amorphous niobium oxide nanoparticles and/or web; and/or
  (d) additional nanostructures selected from undoped tungsten oxide, molybdenum oxide, titanium oxide, and/or vanadium oxide.

The counter electrode 108 may include one or more of the following components:
  (a) passive electrode material selected from cerium(IV) oxide ($CeO_2$), titanium dioxide ($TiO_2$), cerium(III) vanadate ($CeVO_2$), indium(III) oxide ($In_2O_3$), tin-doped indium oxide, tin(II) oxide ($SnO_2$), manganese-doped tin oxide, antimony-doped tin oxide, zinc oxide (ZnO), aluminum-doped zinc oxide (AZO), iron(III) oxide ($Fe_2O_3$), and vanadium(V) oxide ($V_2O_5$);
(b) an active electrode material selected from chromium (III) oxide ($Cr_2O_3$), manganese dioxide ($MnO_2$), iron (II) oxide (FeO), cobalt oxide (CoO), nickel(II) oxide (NiO), rhodium(IV) oxide ($RhO_2$), and iridium(IV) oxide ($IrO_2$);
(c) amorphous nickel oxide nanoparticles and/or web; and/or
(d) conductivity enhancer nanoparticles selected from indium oxide, ITO, and zinc oxide.

In one embodiment, the counter electrode may be planar layer. However, in alternative embodiments, the counter electrode can be non-planar and be porous and/or contain nanoparticles. Moreover, in some cases, one or both of the working and counter electrodes each can be a bi-layer or a multi-layer electrode. While the various embodiments are described with respect to electrochromic windows, the embodiment methods, systems, and devices may also be used in materials for other types of smart windows. Such smart windows may include, but are not limited to, polymer-dispersed liquid crystals (PLDD), liquid crystal displays (LCDs), thermochromics, etc.

Manufacturing Methods

Conventional methods of forming a solid-state electrolyte into an EC laminated window involve a dispensing process. In particular, a liquid electrolyte precursor composition coated on a horizontal electrode plate, and then a second electrode plate is laminated thereon. During the lamination, excess precursor composition may be removed and the edges of the stacked components are sealed with sealant. The window is then subjected to a curing process to solidify the precursor composition and form a solid-state electrolyte.

One major disadvantage of the dispensing-curing process is that the steps of coating, removing extra precursor composition, and applying the edge sealant occur at the same time, which as a result can cause interference between the electrolyte, sealant defects, and poor reproducibility.

Accordingly, embodiments of the present disclosure solidify the electrolyte precursor material to form a solid-state electrolyte before laminating solid-state electrolyte between the electrode plates (e.g., transparent substrates, such as windows, contacting the working and counter electrodes) to overcome the above and/or other drawbacks of the conventional methods.

Figure 2:
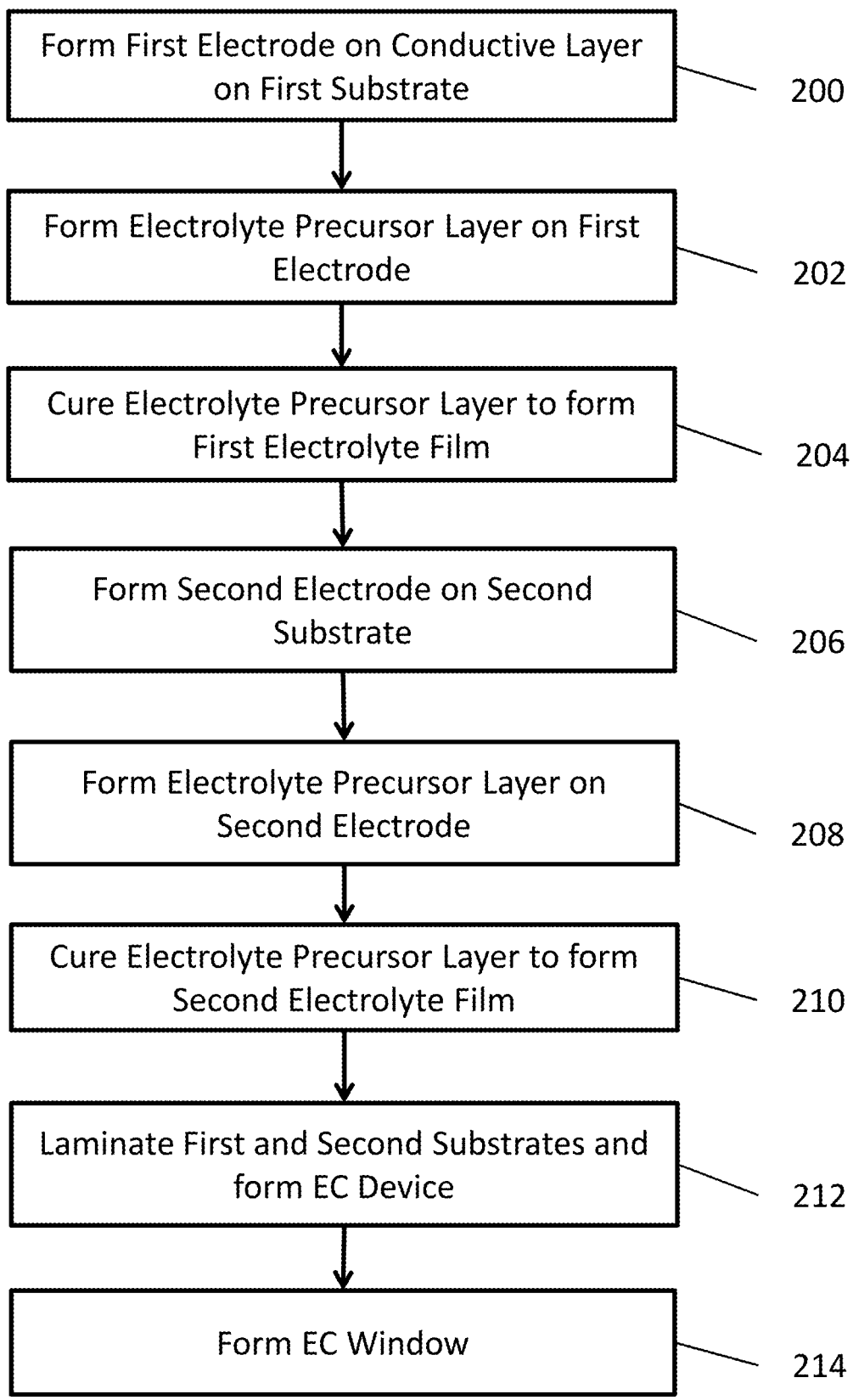
FIG. 2 is a flow diagram of a method of manufacturing an EC device, according to various embodiments of the present disclosure.

FIG. 2 is a flow diagram of a manufacturing process for forming an EC device, according to various embodiments of the present disclosure. Referring to FIG. 2, in step 200, the method includes forming a first electrode on a transparent first substrate, such as a glass or plastic substrate (e.g., a window pane). Herein, "transparent" refers to an element that transmits substantially all of visible radiation (e.g., visible light) incident thereto, such as at least about 90%, at least about 95%, or at least about 98% of the visible radiation incident thereto.

The first electrode may be formed on a transparent, electrically conductive layer already disposed on the first substrate. In some embodiments, the conductive layer may be formed of a transparent conductive oxide (TCO). For example, the conductive layer may be a fluorine-doped tin oxide layer formed by a pyrolytic process, or an ITO layer formed by a sputtering process.

The first electrode may be formed by a solution deposition process and may have a nano-crystalline structure. The first electrode may be cured. For example, the first substrate may be heated to drive of any remaining solvents from the solution deposition of step 300, and/or to improve the crystal structure of the first electrode. However, any suitable method may be used to form the first electrode. The first electrode may operate as a working electrode or a counter electrode in a completed EC device.

In step 202, an electrolyte precursor composition as described above may be coated onto the first electrode to form an electrolyte precursor layer. For example, the precursor composition may be a liquid mixture or solution including network polymer precursors (e.g., structural monomers and/or adhesion promoting monomers), an ionically conducting phase containing the salt, a plasticizer and/or one or more optional additives. In an alternative embodiment, the electrolyte precursor may be coated onto both first and second electrodes (e.g., both working and counter electrodes) of the same electrochromic device, and then both portions of the electrolyte are joined together when the device is assembled.

In some embodiments, the precursor composition may have a viscosity ranging from about 1000 cP to about 90,000 cP, at room temperature, such as a viscosity ranging from about 10,000 cP to about 70,000 cP, or from about 20,000 cP to about 60,000 cP.

The precursor composition may also include a viscosity controlling agent to provide a desired viscosity. The viscosity controlling agent may be a polymer or copolymer formed by polymerizing a portion of network polymer precursors (e.g., a portion of the structural monomers, a portion of the adhesion promoting monomers, or portions of both the structural and adhesion promoting monomers. In other embodiments, the viscosity controlling agent may be an additional thickener such as fumed silica and/or other metal oxide powder added to the precursor composition in step 202.

In step 204, the electrolyte precursor layer may be cured to form a first electrolyte film or layer. For example, the first substrate may be heated to crosslink the precursor composition. In the alternative, the electrolyte precursor layer may be irradiated with UV light to initiate the crosslinking. In other embodiments, the precursor layer may be heated until a solvent of the precursor composition is driven off, resulting in a dry solid-state electrolyte rather than a gel solid-state electrolyte.

In step 206, a second electrode may be formed on a second transparent substrate. The second electrode may be formed by depositing a nano-crystalline layer by a solution deposition, as described in step 200. The first and second electrodes may be different ones of a working electrode and a counter electrode described in the prior embodiments. The second electrode may be formed on a transparent, electrically conductive layer disposed on the second substrate, which may be formed as described above with respect to step 200.

In step 208, the electrolyte precursor composition may be coated onto the second electrode to form an electrolyte precursor layer. For example, the electrolyte precursor layer may be formed by coating, as described above with regard to step 202.

In step 210, the electrolyte precursor layer formed on the second electrode may be cured to form a second electrolyte layer or film. For example, the second substrate may be heated to crosslink the precursor composition. In the alternative, the electrolyte precursor layer may be irradiated with UV light to initiate the crosslinking.

In step 212, the first and second substrates may be stacked and/or laminated together, such that the first and second electrolyte layers contact one another. For example, the stacking may include laminating the first and second electrolyte layers to each other to form a solid-state electrolyte that directly contacts both the first and second electrodes. In some embodiments, the lamination may be performed under vacuum to reduce and/or prevent air bubbles from being trapped between the laminated layers. A sealant or frame may be applied to seal the electrolyte layer in a space between the first and second electrodes and form an EC device.

In step 214, the method may further include attaching a window frame to the EC device to assemble an EC window. The EC device may also be electrically or informationally connected to a control unit configured to control the transparence of the EC device. For example, the first and second electrodes may be electrically connected to the control unit and/or a power source, via the respective transparent conductor layers.

Figure 3:
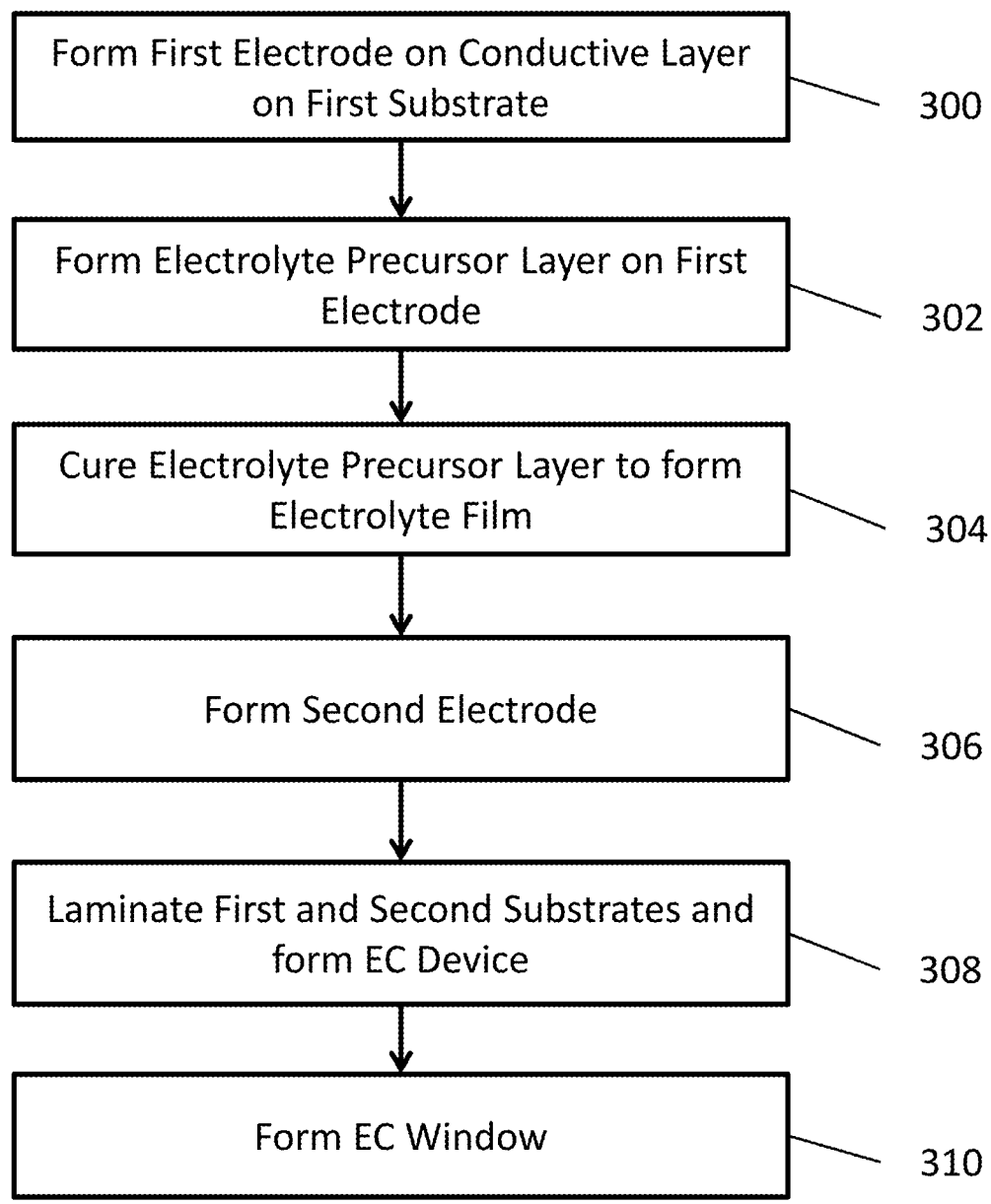
FIG. 3 is a flow diagram of a method of manufacturing an EC device, according to various embodiments of the present disclosure.

FIG. 3 is a flow diagram of a manufacturing process for forming an EC window that includes an EC device, according to various embodiments of the present disclosure. Referring to FIG. 3, in step 300, the method includes forming a first electrode on a transparent first substrate, such as a glass or plastic substrate (e.g., a window pane). The first electrode may be formed on a transparent, electrically conductive layer already disposed on the first substrate. In some embodiments, the conductive layer may be formed of a TCO. For example, the conductive layer may be a fluorine-doped tin oxide layer formed by a pyrolytic process, or an ITO layer formed by a sputtering process.

The first electrode may be formed by a solution deposition process and may have a nano-crystalline structure. The first electrode may be cured. For example, the first substrate may be heated to drive of any remaining solvents from the solution deposition of step 300, and/or to improve the crystal structure of the first electrode.

In step 302, an electrolyte precursor composition as described above may be coated onto the first electrode to form an electrolyte precursor layer. For example, the precursor composition may be a liquid mixture or solution including network polymer precursors (e.g., structural monomers and/or adhesion promoting monomers), an ionically conducting phase containing the salt, a plasticizer and/or one or more optional additives. In an alternative embodiment, the electrolyte precursor may be coated onto both first and second electrodes (e.g., both working and counter electrodes) of the same electrochromic device, and then both portions of the electrolyte are joined together when the device is assembled.

In step 304, the electrolyte precursor layer may be cured to form a solid-state electrolyte film or layer. For example, the first substrate may be heated to crosslink the precursor composition. In the alternative, the electrolyte precursor layer may be irradiated with UV light to initiate the cross-linking.

In step 306, a second electrode may be formed on a second transparent substrate. The second electrode may be formed by depositing a nano-crystalline layer by a solution deposition, as described in step 300. The first and second electrodes may be different ones of a working electrode and a counter electrode described in the prior embodiments. The second electrode may be formed on a transparent, electrically conductive layer disposed on the second substrate, which may be formed as described above with respect to step 300.

In step 308, the first and second substrates may be stacked and/or laminated together such that the second electrode contacts the electrolyte. A sealant or frame may be applied to the perimeters of the first and second substrates, to seal the electrolyte layer in a space between the first and second electrodes and form an EC device.

In step 310, the method may optionally include disposing the EC device in a window frame, to assemble an EC window. The EC device may also be electrically or informationally connected to a control unit configured to control the transparence of the EC device. For example, the first and second electrodes may be electrically connected to the control unit and/or a power source, via the respective transparent conductor layers.

In other embodiments, step 306 may include forming the second electrode directly on the solid-state electrolyte layer (e.g., on the cross-linked electrolyte layer). For example, the second electrode may be solution deposited as described above. Step 308 may include stacking and/or laminating the first and second substrates, such that the second substrate contacts the second electrode.

Figure 4A:
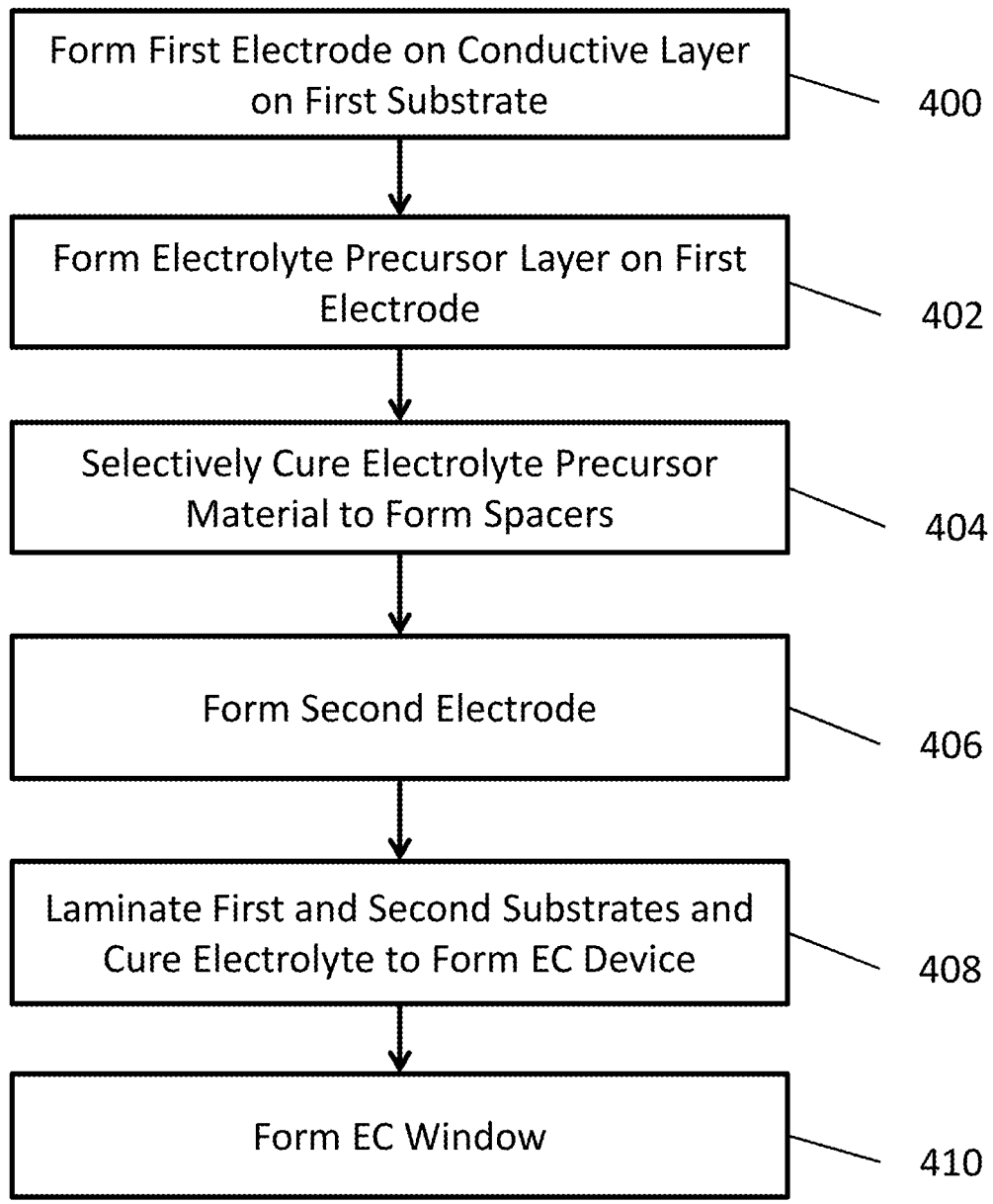
FIG. 4A is a flow diagram of a method of manufacturing an EC device.
Figure 4B:
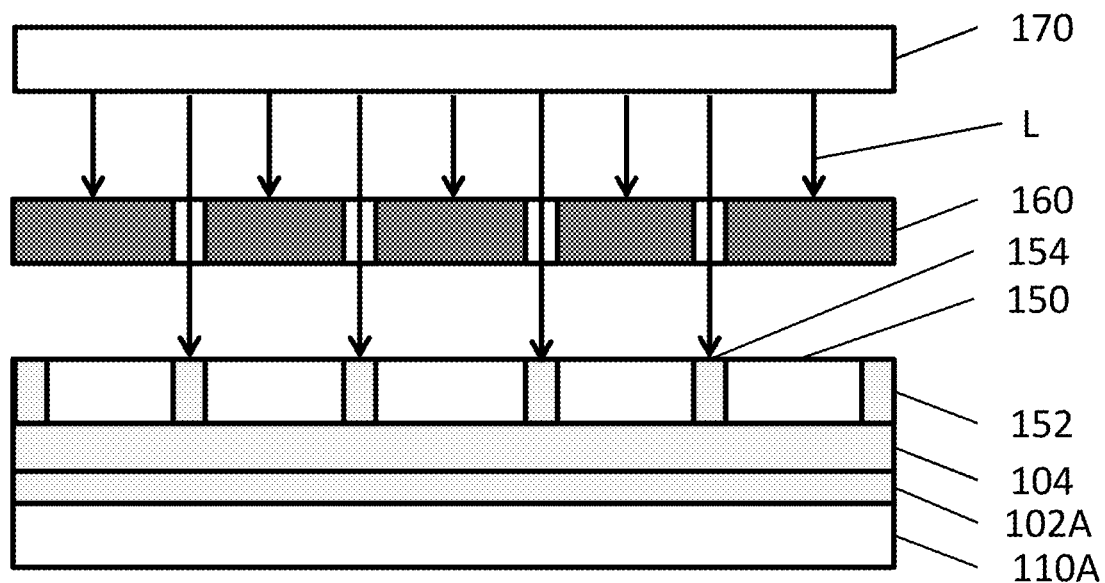
FIGS. 4B and 4C are sectional views illustrating steps of the method of FIG. 4A, according to various embodiments of the present disclosure.
Figure 4C:
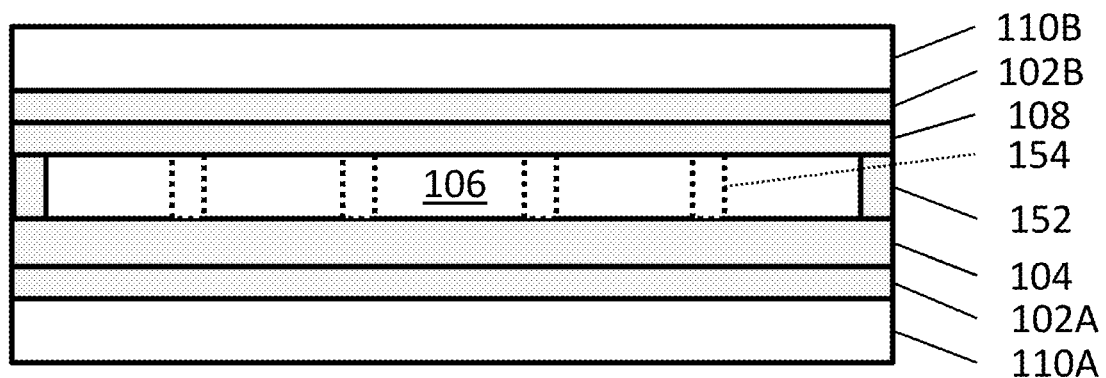

FIG. 4A is a flow diagram of a method of manufacturing an EC device, FIG. 4B is a sectional view illustrating a step 404 of the method of FIG. 4A, and FIG. 4C is a sectional view illustrating a step 408 of the method of FIG. 4A, according to various embodiments of the present disclosure. Referring to FIGS. 4A, 4B, and 4C, the method is similar to the method of FIG. 3, so only the differences therebetween will be discussed in detail.

In step 400, the method includes forming a first electrode 104 a transparent first substrate 110A, such as a glass or plastic substrate (e.g., a window pane). A first transparent conductor 102A may be formed on the first substrate 110A prior to the forming of the first electrode 104. Step 400 may be similar to step 300 of FIG. 3.

In step 402, the method includes forming an electrolyte precursor layer 150 on the first electrode 104. In particular, step 402 may include forming a polymer sealant 152, such as a butyl sealant, on the perimeter of the first electrode 104, and then dispensing an electrolyte precursor composition inside of the sealant 152, to form the precursor layer 150. As such, the sealant 152 may prevent the precursor composition from flowing off of the first substrate 110A. The precursor composition of the precursor layer may be the same as in the previous embodiment, and may be a liquid composition containing polymer network precursors, an ionically conducting phase, and an initiator. For example, the polymer network precursors may comprise network polymers selected from polyurethane acrylate, poly(methyl methacrylate) (PMMA), poly(vinyl butyral-co-vinyl alcohol-co-vinyl acetate) (PVB), poly(ethylene oxide) (PEO), fluorinated co-polymers such as poly(vinylidene fluoride-co-hexafluoropropylene), poly(acrylonitrile) (PAN), poly(vinyl alcohol) (PVA), epoxy polymer, polysiloxane, and mixtures thereof. The polymer network precursors may also comprise adhesion promoting monomers selected from isobornyl acrylate (IBOA), ethoxylated nonylphenol acrylate, poly(ethylene glycol) diacrylate (PEGDA), poly(ethylene glycol) dimethacrylate (PEGDMA), trimethylolpropane triacrylate (TMPTA), ethoxyethoxyethyl acrylate, tripropylene glycol diacrylate (TPGDA), butyl acrylate (BA), hexanediol diacrylate (HDDA), and combinations thereof. The ionically conducting phase may comprise a solvent, a plasticizer, and an electrolyte salt, as described above.

In step 404, a mask 160 and a light source 170, such as a UV light source, are disposed above the first substrate 110. Light L emitted by the light source 170 is radiated through holes located in the mask 160, to selectively irradiate only portions of the precursor composition and form spacers 154 in the irradiated portions of the precursor layer 150. The polymer network precursors in the UV light irradiated portions of the liquid precursor layer 150 are cross-linked to form solid polymer spacers 154 disposed in and surrounded by the remainder of the liquid precursor composition in the precursor layer 150.

The spacers 154 may be arranged in an array or randomly in the liquid precursor layer, and may be disposed in a central region of the precursor layer 150 (e.g., on a central region of the first substrate 110A. The spacers 154 may have a height equal to the thickness of the precursor layer 150. In some embodiments, the height of the spacers 154 may be substantially the same as a thickness of the sealant 152, taken in a direction perpendicular to the plane of the first substrate 110A. The spacers 154 may be any suitable shape, such as columnar or prismatic.

In step 406, a second electrode 108 may be formed on a second transparent substrate 110B, which may comprise a second transparent conductor 102B. Step 406 may be similar to step 306 of FIG. 3.

In step 408, the first and second substrates 110A, 110B are laminated together. During the lamination, the sealant 152 may separate perimeter regions of the substrates 110A, 110B, such that the substrates 110A, 110B are separated by a gap in which the precursor layer 150 is disposed.

The spacers 154 may be configured to separate opposing central regions of the substrates 110A, 110B, so as to maintain the gap between the substrates 110A, 110B. In other words, the spacers 154 prevent the otherwise unsupported central region of the second substrate 110B from sagging towards the first substrate 110A, and thereby reducing the thickness of a corresponding central region of the precursor layer 150. Accordingly, the sealant 152 and/or the spacers 154 may operate to insure that the precursor layer 150 has a consistent thickness.

After the lamination, step 408 includes curing the precursor layer 150 to cross link the polymer network precursors in the liquid portions of the precursor layer 150 to form an electrolyte layer 106, such as a gel electrolyte described above. The curing may include any suitable curing method, such as thermal or UV curing. Since the precursor layer has a substantially uniform thickness, due to maintaining a substantially uniform gap between the substrates 110A, 110B using the spacers 154, the electrolyte layer 106 also has substantially uniform thicknesses. As a result, the electrolyte layer 106 may be free or substantially free of optical defects due to thickness variation. Furthermore, the uniform electrolyte layer 106 thickness and/or the presence of the spacers 154 provides a uniform gap thickness (i.e., spacing) between the working and counter electrodes of the electrochromic device. This facilitates uniform device performance and may also enhance reliability and longevity of the device.

In addition, the curing incorporates the spacers 154 into the electrolyte layer 106. Further, since the spacers 154 and electrolyte layer 106 are formed of the same electrolyte precursor composition, the spacers 154 and the electrolyte layer 106 have the same refractive index. According, it may not be possible for the human eye to detect the spacers 154 in the electrolyte layer 106, after the electrochromic device is incorporated into the electrochromic window in step 410.

Figure 5:
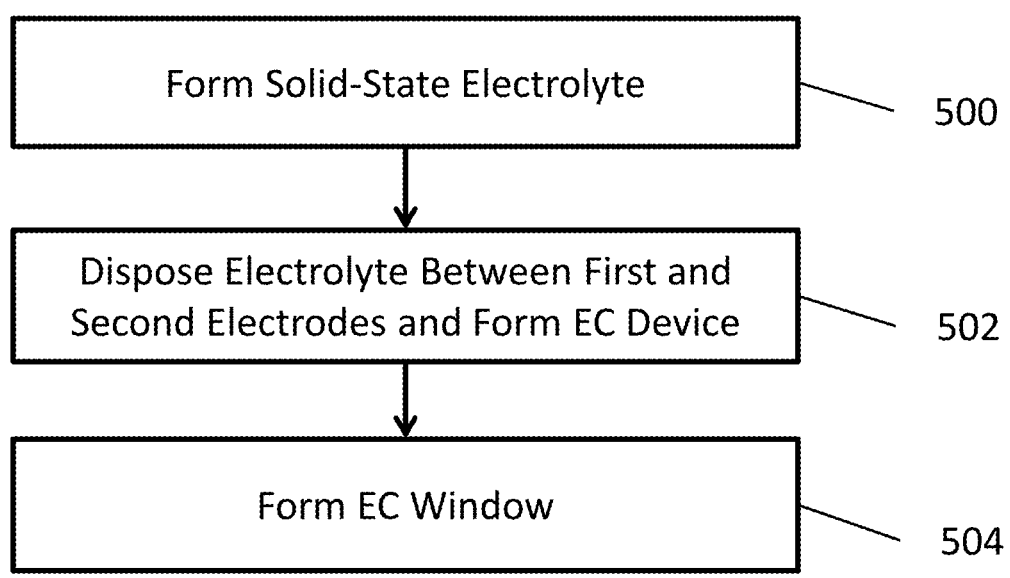
FIG. 5 is a flow diagram of a method of manufacturing an EC device, according to various embodiments of the present disclosure.

FIG. 5 is a flow diagram of a manufacturing process for forming an EC window that includes an EC device, according to various embodiments of the present disclosure. Referring to FIG. 5, in step 500 the method includes forming a solid-state electrolyte. For example, an electrolyte precursor composition as described above may be coated onto a substrate to form the electrolyte precursor layer. In some embodiments, the substrate may have a low adhesion and/or non-stick surface, such as a Teflon covered surface, to facilitate removal of the electrolyte.

The electrolyte precursor layer may then be cured to form a solid-state electrolyte. For example, the precursor layer may be cured using heat and/or UV light to form a gel electrolyte. In other embodiments, in step 500 the precursor layer may be heated until a solvent of the precursor composition is driven off, resulting in a dry solid-state electrolyte rather than a gel solid-state electrolyte. The solid-state electrolyte may then be removed from the substrate.

In still other embodiments, step 500 may include using an extruder to extrude an electrolyte precursor composition in the shape of an electrolyte layer. The extruded electrolyte layer may be cured with heat and/or UV light after exiting the extruder, to form a free-standing electrolyte.

In further embodiments, step 500 may include using an extruder to extrude a solid electrolyte composition. For example, the solid electrolyte composition may be melted by heating before or during the extrusion. The melted electrolyte composition may then be extruded and/or shaped into an electrolyte layer, and then cooled, to form a free-standing solid electrolyte.

In step 502, the free-standing electrolyte may be disposed between first and second electrodes. For example, the electrolyte may be laminated between first and second substrates upon which the first and second electrodes are respectively formed. The first and second substrates may also include conductive layers, as described above. A sealant or frame may be applied to seal the electrolyte in a space between the first and second substrates and form an EC device.

In other embodiments, step 502 may include forming first and second electrodes on opposing sides of the electrolyte. For example, the first and second electrodes may be formed by solution deposition on each side of the electrolyte. The electrolyte may then be disposed between transparent substrates, and sealant or frame may be applied to seal the electrolyte between the first and second substrates and form an EC device.

In step 504, the method may optionally include disposing the EC device in a window frame, to assemble an EC window. The EC device may also be electrically or informationally connected to a control unit configured to control the transparence of the EC device. For example, the first and second electrodes may be electrically connected to the control unit and/or a power source, via the respective transparent conductor layers.

Figure 6:
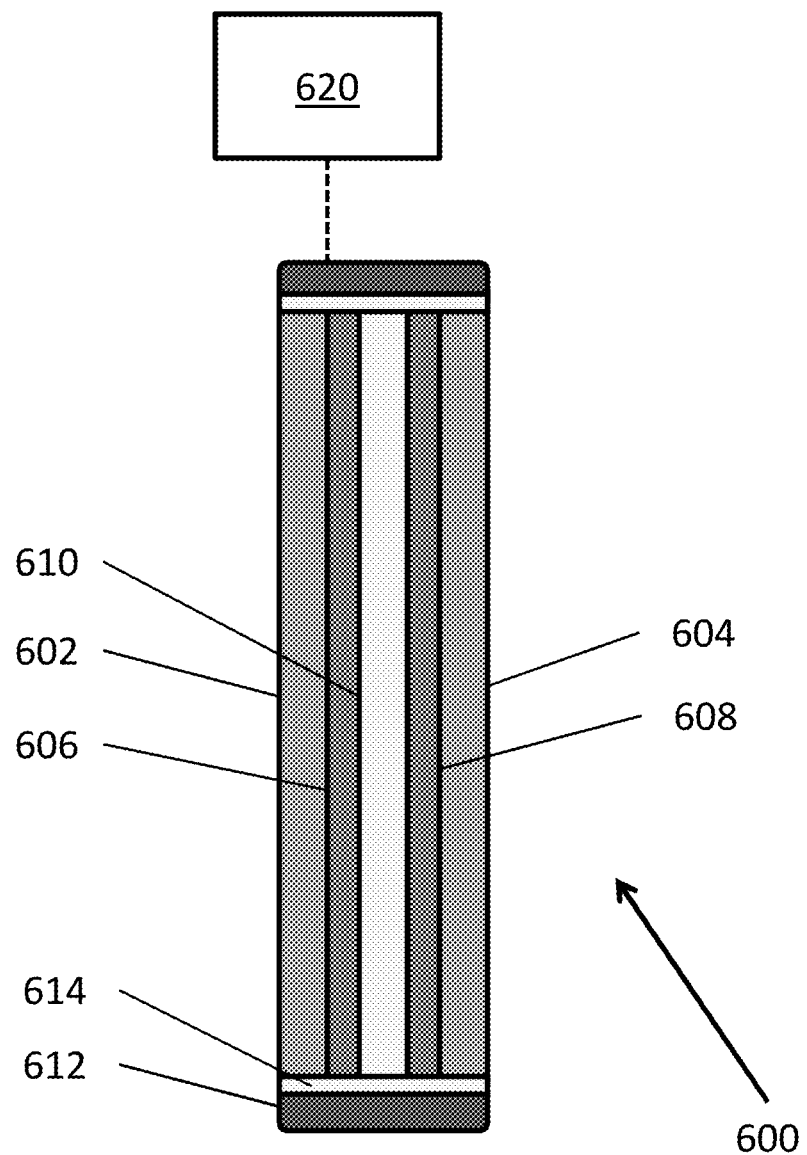
FIG. 6 is a cross-sectional view of an EC window, according to various embodiments of the present disclosure.

FIG. 6 is a cross-sectional view of an EC window 600 that may be formed according to the methods of FIG. 2, 3, 4, or 5. Referring to FIG. 6, the EC window 600 may include opposing first and second substrates 602, 604, first and second electrodes 606, 608, respectively disposed on the first and second substrates 602, 604, a solid-state electrolyte layer 610 disposed between the electrodes 606, 608, and a frame 612 containing a sealant 614, such as polymer sealant.

The first and second electrodes 606, 608 may be disposed on opposing inner surfaces of the first and second substrates 602, 604. The frame 612 may be a window frame surrounding the perimeter of the first and second substrates 602, 604.

As discussed above, the method of forming an electrochromic (EC) device, such as the window 600, includes forming a solid-state first electrolyte layer 610 as described above. After forming the solid-state first electrolyte layer 610, the method includes laminating the first solid-state first electrolyte layer 610 between a transparent first substrate 602 and a transparent second substrate 604 such that a transparent first electrode 606 (e.g., working electrode) is disposed between the first substrate 602 and a first side (e.g., left side in FIG. 6) of the solid-state first electrolyte layer 610, and a transparent second electrode 608 (e.g., counter electrode) is disposed between the second substrate 604 and a second side (e.g., right side in FIG. 6) of the solid-state first electrolyte layer 610. The method also includes applying a sealant 614 to seal the solid-state first electrolyte layer between the first 602 and second 604 substrates and to form the EC device 600.

The EC window 600 may further include a control unit 620 electrically connected to the electrodes 606, 608 and configured to control the transparency of the EC window 600. In some embodiments, the control unit 620 may be disposed outside of the frame 612 as shown in FIG. 6. However, the control unit 620 may be incorporated into the frame 612. The control unit 620 may be configured to control multiple EC windows.

Although not shown, the EC window 600 may also additional layers, such as UV protective layers, transparent conductive layers, etc., as described above.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. A method of forming an electrochromic (EC) device, the method comprising:
    forming a first electrode on a transparent first substrate;
    dispensing an electrolyte precursor composition to form a precursor layer on the first electrode;
    selectively curing only portions of the electrolyte precursor composition to form spacers in the precursor layer;
    laminating the first substrate to a transparent second substrate; and
    curing the precursor layer to form an electrolyte layer,
    wherein the electrolyte precursor composition is a liquid composition comprising polymer network precursors, an ionically conducting phase, and an initiator, and
    wherein the selectively curing the precursor composition comprises using a mask to selectively irradiate with ultraviolet light only portions of the precursor composition to form the spacers in the irradiated portions of the precursor layer.

2. The method of claim 1, further comprising disposing a sealant on the perimeter of the first substrate, prior to the dispensing, such that the precursor layer is disposed inside of the sealant.

3. The method of claim 2, wherein:
    the sealant is configured to separate the perimeter regions of the first and second substrates; and
    the spacers are configured to separate opposing central regions of the first and second substrates.

4. The method of claim 1, wherein:
    the polymer network precursors in the selectively irradiated portions of the precursor layer are cross-linked to form solid polymer spacers surrounded by a remainder of the liquid precursor composition in the precursor layer; and
    a height of the spacers is substantially the same as a thickness of the sealant taken in a direction perpendicular to a plane of the first substrate.

5. A method of forming an electrochromic (EC) device, the method comprising:
    providing a transparent first substrate having a first electrode;
    disposing a sealant on a perimeter of the first substrate;
    dispensing an electrolyte precursor composition to form a precursor layer on the first electrode after disposing the sealant on the perimeter of the first substrate, such that the precursor layer is disposed inside of the sealant;
    laminating the first substrate to a transparent second substrate after dispensing the electrolyte precursor; and
    curing the precursor layer by irradiating the precursor layer with ultraviolet light to form an electrolyte layer after the laminating the first substrate to the transparent second substrate.

6. The method of claim 5, wherein the sealant is configured to separate the perimeter regions of the first and second substrates.

7. The method of claim 5, wherein:
    the electrolyte precursor composition is a liquid composition comprising polymer network precursors, an ionically conducting phase, and an initiator; and
    the curing the precursor layer comprises cross-linking the precursor layer.

8. The method of claim 5, further comprising selectively curing only portions of the electrolyte precursor composition to form spacers in the precursor layer prior to laminating the first substrate to the transparent second substrate.

9. The method of claim 5, wherein transparent second substrate contains a second electrode thereon.

* * * * *